US010382112B2

(12) United States Patent
Coutts

(10) Patent No.: US 10,382,112 B2
(45) Date of Patent: Aug. 13, 2019

(54) BEAMFORMING USING PASSIVE TIME-DELAY STRUCTURES

(71) Applicant: Facebook, Inc., Menlo Park, CA (US)

(72) Inventor: Gordon Michael Coutts, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/010,414

(22) Filed: Jun. 16, 2018

(65) Prior Publication Data

US 2019/0020399 A1 Jan. 17, 2019

Related U.S. Application Data

(60) Provisional application No. 62/532,482, filed on Jul. 14, 2017.

(51) Int. Cl.
| | |
|---|---|
| *H04B 7/06* | (2006.01) |
| *H01Q 3/26* | (2006.01) |
| *H04W 72/04* | (2009.01) |
| *H01Q 15/08* | (2006.01) |
| *H01Q 21/00* | (2006.01) |

(Continued)

(52) U.S. Cl.
CPC ......... *H04B 7/0617* (2013.01); *H01Q 3/2605* (2013.01); *H01Q 3/2682* (2013.01); *H01Q 3/40* (2013.01); *H01Q 15/08* (2013.01); *H01Q 21/0031* (2013.01); *H04B 7/0667* (2013.01); *H04B 7/0673* (2013.01); *H04W 16/28* (2013.01); *H04W 72/0446* (2013.01);

(Continued)

(58) Field of Classification Search
CPC .. H04B 7/0408; H04B 7/0617; H04B 7/0695; H04W 16/28; H04W 72/1231

USPC ............. 455/63.1, 63.4, 13.3, 562.1, 575.7; 375/299; 342/90, 754, 371, 373, 375, 342/368

See application file for complete search history.

(56) References Cited

U.S. PATENT DOCUMENTS

| | | | |
|---|---|---|---|
| 5,936,588 A | 8/1999 | Rao et al. | |
| 6,348,890 B1 * | 2/2002 | Stephens | H01Q 3/2676 342/375 |

(Continued)

OTHER PUBLICATIONS

Notification of transmittal of the international search report and the written opinion of the international searching authority, or the declaration, PCT/US2018/038635, dated Sep. 17, 2018.

*Primary Examiner* — Tan H Trinh
(74) *Attorney, Agent, or Firm* — Brian R. Short

(57) ABSTRACT

Apparatuses, methods, and systems for beamforming to multiple users using switched passive time-delay structures are disclosed. One method includes an input switch that receives a plurality of input signals for transmission. Further, the apparatus includes a plurality of passive time-delay structures, wherein the input switch selectively connects the plurality of input signals to at least one of the plurality of passive time-delay structures, and wherein each of the passive time-delay structures is preconfigured to provide a plurality of delayed signals wherein each of the plurality of delayed signals is a delayed version of a one of the plurality of input signals. The apparatus further includes an antenna array, wherein the antenna array receives the plurality of delayed signals of the passive time-delay structures, and generates a beamforming pattern corresponding with a selected one of the passive time-delay structures.

20 Claims, 19 Drawing Sheets

(51) Int. Cl.
*H04W 16/28* (2009.01)
*H01Q 3/40* (2006.01)
*H01Q 1/24* (2006.01)
*H01Q 21/24* (2006.01)
*H01Q 25/00* (2006.01)
*H04B 7/10* (2017.01)

(52) U.S. Cl.
CPC .......... *H01Q 1/246* (2013.01); *H01Q 21/245* (2013.01); *H01Q 25/00* (2013.01); *H04B 7/10* (2013.01)

(56) References Cited

U.S. PATENT DOCUMENTS

| | | | |
|---|---|---|---|
| 6,452,546 B1* | 9/2002 | Stephens | H01Q 3/2676 342/368 |
| 6,590,531 B2* | 7/2003 | McKinzie, III | H01Q 3/2682 342/375 |
| 7,084,811 B1 | 8/2006 | Yap | |
| 8,335,167 B1 | 12/2012 | Zhang et al. | |
| 8,644,367 B2 | 2/2014 | Nagaishi et al. | |
| 9,543,662 B2* | 1/2017 | Marr | H01Q 25/008 |
| 10,236,961 B2* | 3/2019 | Coutts | H01Q 3/2682 |
| 2003/0043071 A1* | 3/2003 | Lilly | H01Q 3/22 342/368 |
| 2004/0174299 A1* | 9/2004 | Casas | H01Q 1/246 342/373 |
| 2005/0200516 A1* | 9/2005 | Brown | G01S 13/32 342/90 |
| 2006/0220956 A1* | 10/2006 | Richardson | G01S 7/2813 342/375 |
| 2007/0205943 A1 | 9/2007 | Nassiri-Toussi et al. | |
| 2007/0285314 A1* | 12/2007 | Mortazawi | H01Q 1/3233 342/375 |
| 2010/0156573 A1* | 6/2010 | Smith | H01P 3/081 333/239 |
| 2012/0327516 A1 | 12/2012 | Abbaspour-Tamijani | |
| 2013/0336505 A1* | 12/2013 | Button | H04R 3/12 381/303 |
| 2014/0203969 A1* | 7/2014 | Maltsev | H01Q 3/36 342/375 |
| 2014/0241463 A1* | 8/2014 | Leenaerts | H04B 7/0617 375/299 |
| 2014/0348149 A1 | 11/2014 | Kinamon et al. | |
| 2015/0180133 A1* | 6/2015 | Hunt | H01Q 15/0086 343/754 |
| 2015/0263424 A1* | 9/2015 | Sanford | H01Q 3/46 342/371 |
| 2015/0264584 A1 | 9/2015 | Dayanandan et al. | |
| 2016/0191176 A1* | 6/2016 | O'Keeffe | H01Q 3/267 455/63.4 |
| 2016/0248172 A1 | 8/2016 | Marr et al. | |
| 2017/0063461 A1* | 3/2017 | Prucnal | H04B 10/25752 |
| 2017/0149135 A1 | 5/2017 | Kinamon et al. | |
| 2017/0163328 A1* | 6/2017 | Tiebout | H04B 7/0408 |
| 2017/0195215 A1 | 7/2017 | Gomadam et al. | |
| 2017/0215210 A1 | 7/2017 | Lipowski et al. | |
| 2017/0230094 A1 | 8/2017 | Da Silva et al. | |
| 2018/0019519 A1* | 1/2018 | Liao | H01Q 13/10 |
| 2018/0131102 A1* | 5/2018 | Wang | H01Q 3/38 |
| 2018/0375550 A1* | 12/2018 | Zhou | H04B 7/0408 |
| 2019/0013847 A1* | 1/2019 | Kim | H04B 7/0617 |

* cited by examiner

BEAMFORMING USING PASSIVE TIME-DELAY STRUCTURES

RELATED APPLICATIONS

This patent application claims priority to U.S. Provisional Patent Application Ser. No. 62/532,482 filed Jul. 14, 2017, which is herein incorporated by reference.

FIELD OF THE DESCRIBED EMBODIMENTS

The described embodiments relate generally to wireless communications. More particularly, the described embodiments relate to systems, methods and apparatuses for beamforming to multiple users using switched passive time-delay structures.

BACKGROUND

At least some multiple antenna systems operate to form beams for enhanced communication between wireless devices.

It is desirable to have methods apparatuses, and systems for beamforming to multiple users using switched passive time-delay structures.

SUMMARY

An embodiment includes an apparatus. The apparatus includes a plurality of passive time-delay structures, wherein each of the passive time-delay structures is preconfigured to provide a plurality of output signals, wherein each of the plurality of output signals is a delayed version of a one of a plurality of input signals. The apparatus further includes an antenna array, wherein the antenna array generates a beamforming pattern corresponding with a selected one of the passive time-delay structures, and a switch, wherein the switch operates to selectively connect the plurality of input signals through the selected one of the plurality of passive time-delay structures to the antenna array.

An embodiment includes an apparatus. The apparatus includes a plurality of passive time-delay structures, wherein each of the passive time-delay structures is preconfigured to provide a plurality of output signals, wherein each of the plurality of output signals is a delayed version of a one of a plurality of input signals. The apparatus further includes an antenna array, wherein the antenna array generates a beamforming pattern corresponding with a selected one of the passive time-delay structures, and a switch, wherein the switch operates to selectively connect the plurality of input signals through the selected one of the plurality of passive time-delay structures to the antenna array.

Another embodiment includes a method. The method includes generating, by a selected one of a plurality of passive time-delay structures, a plurality of output signals, wherein the plurality of output signals is a delayed version of a one of a plurality of input signals, generating, by an antenna array, a beamforming pattern corresponding with the selected one of the passive time-delay structures, and selectively connecting, by a switch, the plurality of input signals through the selected one of the plurality of passive time-delay structures to the antenna array.

Another embodiment includes a method. The method includes generating, by an antenna array, a beamforming pattern corresponding with a selected one of a plurality of passive time-delay structures, receiving, by the antenna array, a plurality of received signals through the beamforming pattern, connecting the plurality of received signals through at least one of the plurality of passive time-delay structures, wherein each of the passive time-delay structures is preconfigured to receive the plurality of received signals and generate a plurality of delayed received signals, and wherein each of a plurality of delayed received signals is a delayed version of a one of the plurality of the received signals, and processing the plurality of delayed received signals corresponding with the selected one of the plurality of passive time-delay structures.

In an embodiment according to the invention, one or more computer-readable non-transitory storage media may embody software that is operable when executed to perform a method according to the invention or any of the above mentioned embodiments.

In an embodiment according to the invention, a system may comprise: one or more processors; and at least one memory coupled to the processors and comprising instructions executable by the processors, the processors operable when executing the instructions to perform a method according to the invention or any of the above mentioned embodiments.

In an embodiment according to the invention, a computer program product, preferably comprising a computer-readable non-transitory storage media, may be operable when executed on a data processing system to perform a method according to the invention or any of the above mentioned embodiments.

Embodiments according to the invention are in particular disclosed in the attached claims directed to an apparatus, and methods, wherein any feature mentioned in one claim category, e.g. method, can be claimed in another claim category, e.g. apparatus, storage medium, system and computer program product, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for beamforming to multiple users using a plurality of switched passive time-delay structures. For an embodiment, each of the different selectable passive time-delay structures provides for the creation of a beamforming pattern by signals transmitted from an antenna array. For an embodiment, the different beamforming patterns created by the different selectable passive time-delay structures establish wireless links with receiving devices. Further, for an embodiment, the at least one of the passive time-delay structures includes a Rotman lens. For an embodiment, a delay of signal propagating through at least one Rotman lens is adjustable.

Figure 1:
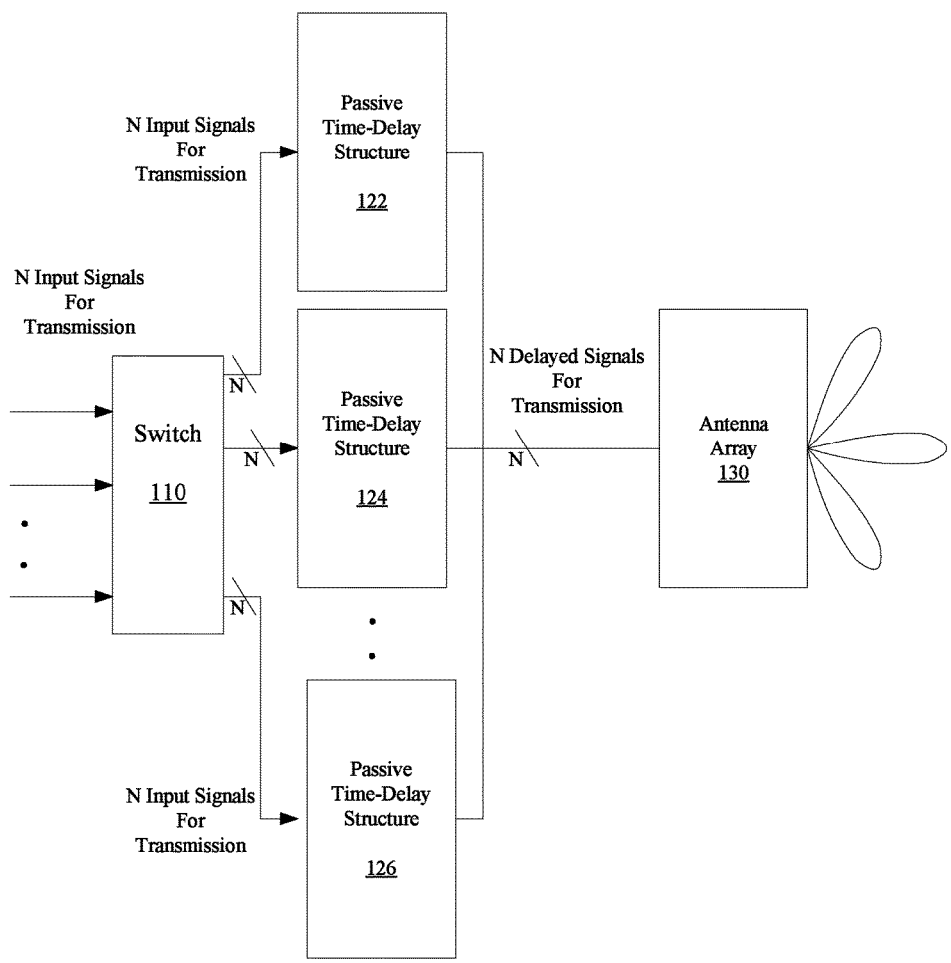
FIG. 1 shows a beamforming system that includes selectable passive time-delay structures, according to an embodiment.

FIG. 1 shows a beamforming system that includes selectable passive time-delay structures, according to an embodiment. As shown, for this embodiment, a switch 110 receives a plurality of (N) input (communication) signals for transmission. The switch 110 selectively connects that plurality of (N) input signals to at least one of a plurality of passive time-delay structures 122, 124, 126. Each of the passive time-delay structures 122, 124, 126 is preconfigured to provide a plurality of delayed signals wherein each of the plurality of delayed signals is a delayed version of a one of the plurality of input signals.

The plurality of communication signals can include one or more of many different types of signals. For example, for an embodiment, the plurality of input signals include modulated signals for data transmission to one or more transceivers. For other embodiments, the plurality of input signals includes one or more of CW (continuous wave) or pulsed signals for RADAR, measurement of channel sounding.

Further, as shown, an antenna array 130 receives the plurality of output (delayed) signals of the passive time-delay structures, and generates a beamforming pattern corresponding with a selected one of the passive time-delay structures. The beamforming patterns created by the selection of the passive-time delay structures include beams that provide enhanced wireless links to select receiving devices.

An output switch can be included for receiving the plurality of output signals of the passive time-delay structures and connecting a selected one of the passive time-delay structures to the antenna array.

Figure 19:
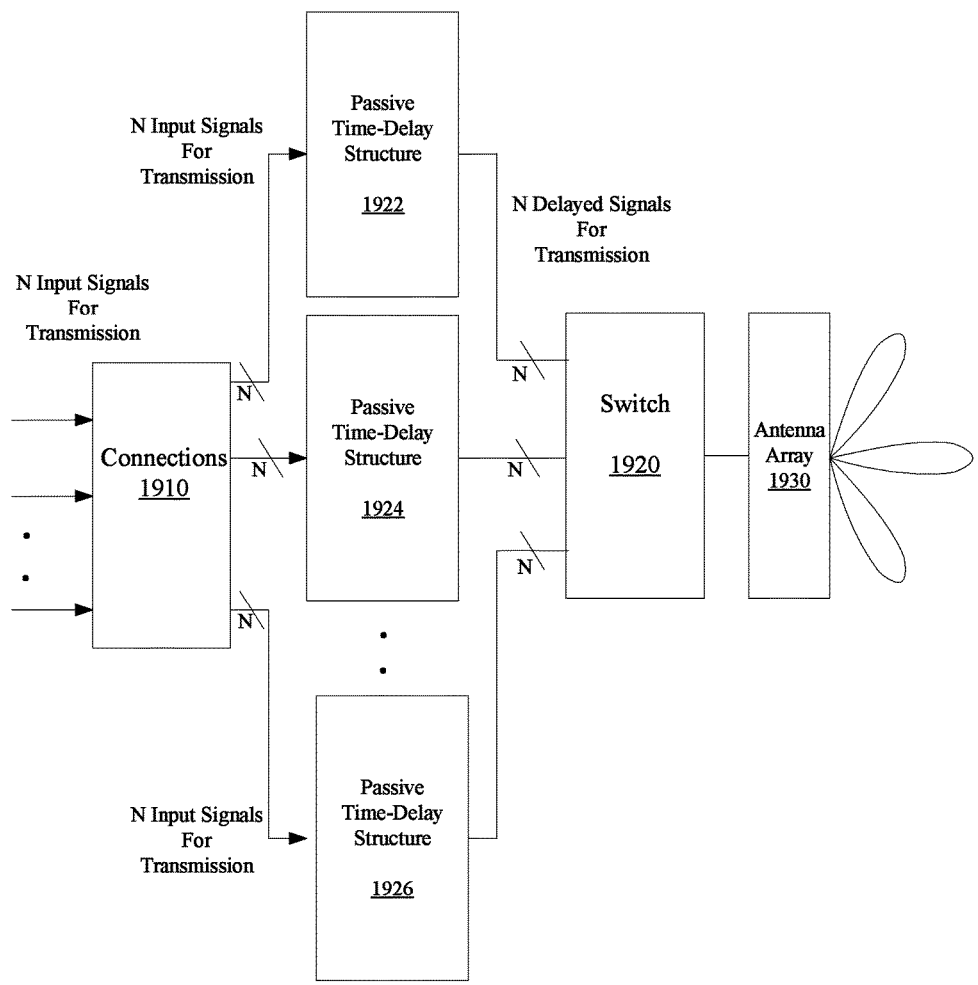
FIG. 19 shows a beamforming system that includes selectable passive time-delay structures, according to another embodiment.

While an input switch 110 is shown in FIG. 1, it is to be understood that this switch can be located elsewhere as long as the switch is able to provide the selective connectivity of the passive time-delay structures 122, 124, 126. For example, FIG. 19 shows an example of such an embodiment.

As previously described, selection of each of the passive time-delay structures 122, 124, 126 provides for the formation of a beamforming pattern. For an embodiment, each of the beamforming patterns of each of the passive time-delay structures 122, 124, 126 is different. Accordingly, a specific passive time-delay structure can be selected for formation of a corresponding beamforming pattern which provides for establishing a wireless link with a desired target user. The wireless link can be utilized for both downlink wireless communication from the beamforming system to the user, and uplink wireless communication from the user to the beamforming system.

The beamforming patterns can include more than one beam. Accordingly, multiple users can be targeted using a single beam forming pattern formed by a passive time-delay structure. For an embodiment, TDD (time division duplex) can be utilized to time allocate which user the beamforming system is communicating with at different points in time for a single passive time-delay structure. Further, multiple users could be simultaneously communicated with using a single passive time-delay structure for broadcast wireless communication to multiple users. As described, each of the passive time-delay structures includes a beamforming pattern. Accordingly, each of the passive time-delay structure can support a different set of user. The different sets of users can be determined by the directions of the beams of the beamforming pattern formed by the passive time-delay structure.

As previously described, each of the passive time-delay structures 122, 124, 126 is preconfigured to provide a plurality of output signals wherein each of the plurality of output signals is a delayed version of a one of the plurality of input signals. Exemplary embodiments of the passive time-delay structures 122, 124, 126 include a Rotman lens or a Butler matrix. A Rotman lens is a true time-delay passive structure that enables an antenna array to generate multiple simultaneous fixed beams using a shared aperture. A Butler matrix is a type of beamforming network that typically includes phase shifters. In contrast, to the Rotman lens that provides a true time delay, the phase shifters of the Butler matrix can suffer from frequency selectivity. That is, the delay may vary according to the frequency of the signal passing through the phase shifters.

Figure 2:
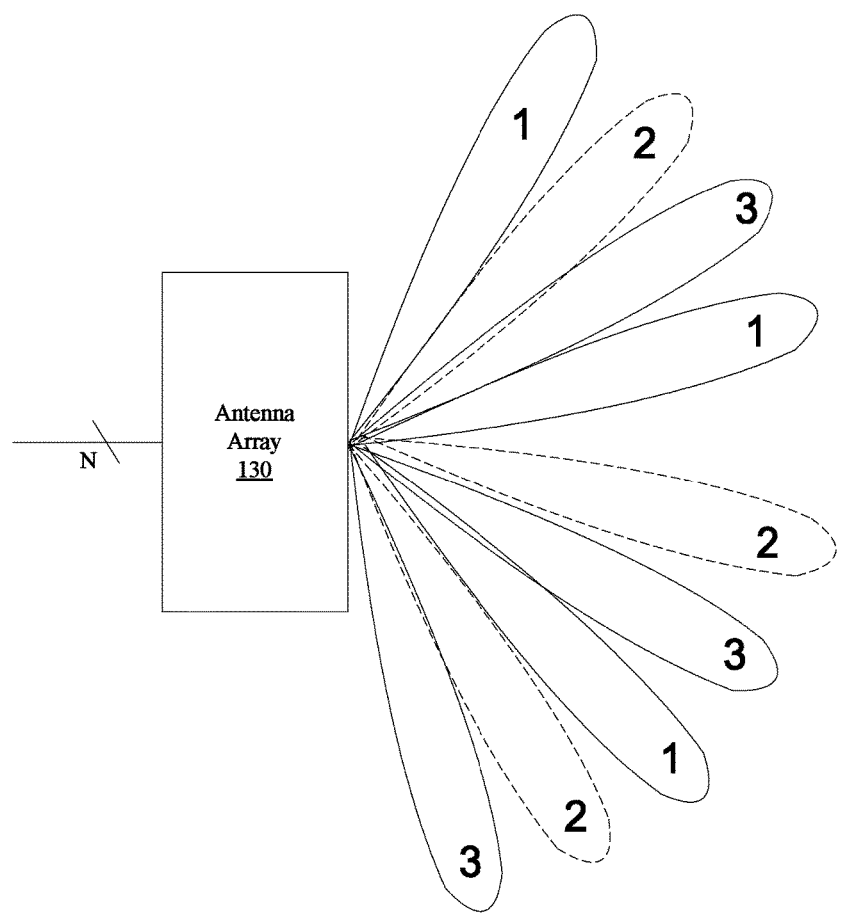
FIG. 2 shows beamforming patterns formed by selection of different passive time-delay structures of the beamforming system, according to an embodiment.

FIG. 2 shows beamforming patterns formed by selection of different passive time-delay structures of the beamforming system, according to an embodiment. As shown, a first antenna pattern (1) may be formed by the selection of a first one of the plurality of passive time-delay structures, a second antenna pattern (2) may be formed by the selection of a second one of the plurality of passive time-delay structures, and a third antenna pattern (3) may be formed by the selection of a third one of the plurality of passive time-delay structures. It is to be understood that any number of different antenna patterns may be formed.

Figure 3:
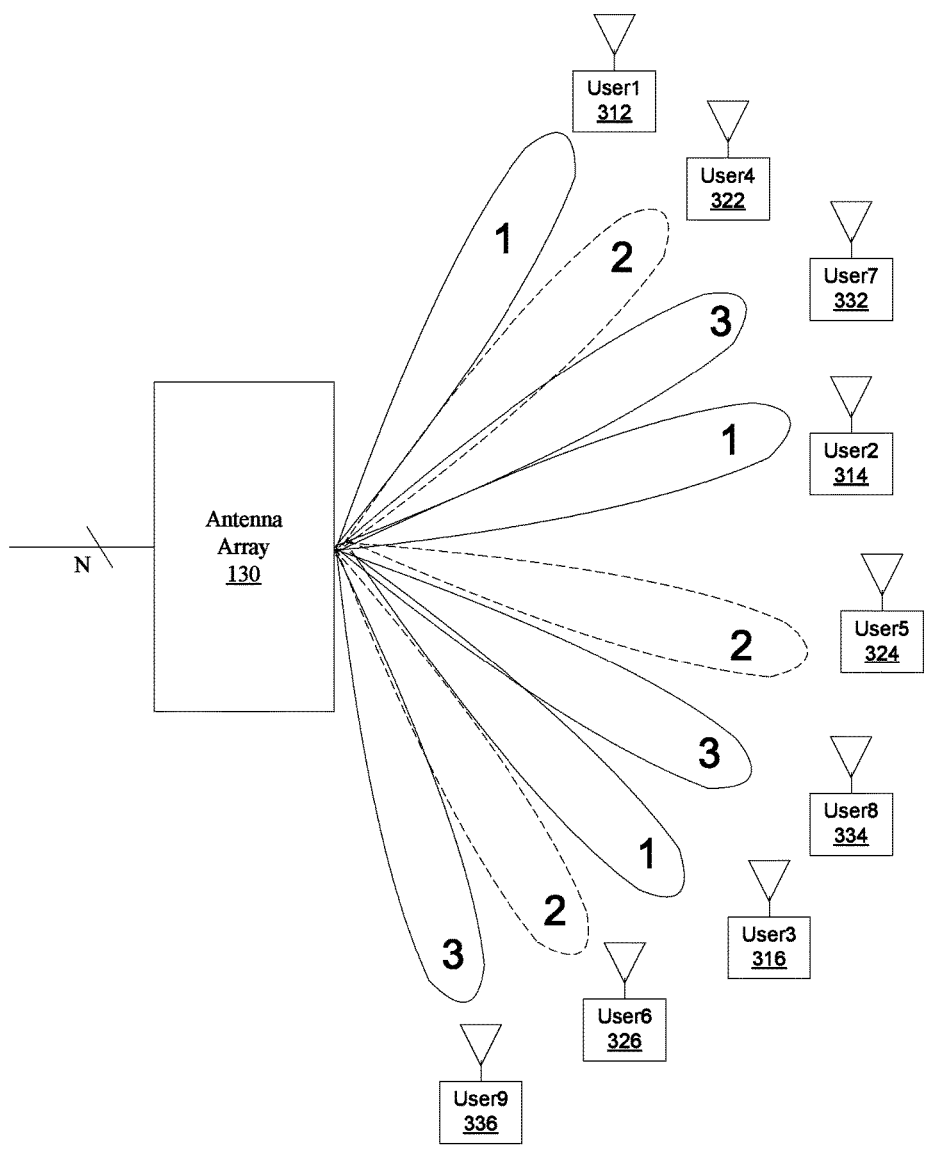
FIG. 3 shows the beamforming system communicating with different users using different beamforming patterns, according to an embodiment.

FIG. 3 shows the beamforming system communicating with different users using different beamforming patterns, according to an embodiment. As shown, a different set of transceivers (for example, users 1-9) receive wireless signals from the antenna array 130 for the selection of different of beam formers (such as, the passive time-delay structures). For example, as shown, a first set of users 312, 314, 316 are aligned with beams formed by the antenna pattern (1) created through the selection of a first beam former (for example, a first passive time-delay structure). A second set of users 322, 324, 326 are aligned with beams formed by the antenna pattern (2) created through the selection of a second beam former (for example, a second passive time-delay structure). A third set of users 332, 334, 336 are aligned with beams formed by the antenna pattern (3) created through the selection of a third beam former (such as, a third passive time-delay structure).

Scheduling of wireless communication between the beamforming system and multiple users can be enabled by selecting the passive time-delay structure that creates a beam directed to the user that the beamforming system is communicating. The formed beams can be utilized to enable communication both from the beamforming system to the users, and from the users to the beamforming system.

As previously described, for an embodiment, TDD (time division duplex) can be utilized to time allocate which user the beamforming system is communicated with at a different points in time for a single passive time-delay structure. Transmission channels between the antenna array 130 of the beamforming system and multiple users (such as, users 312, 314, 316) can be simultaneously characterized (trained) during selection of the first beamforming pattern (1). Further, communication between the antenna array 130 and the beamforming system and each of the individual multiple users (such as, users 312, 314, 316) can be scheduled during selection of the first beamforming pattern (1).

At least some embodiment include grouping, wherein multiple users are grouped for each of the beamforming patterns. Processing of communication between the beamforming system and the users can utilize the grouping for improved data transfer between the beamforming system and the users.

Figure 4:
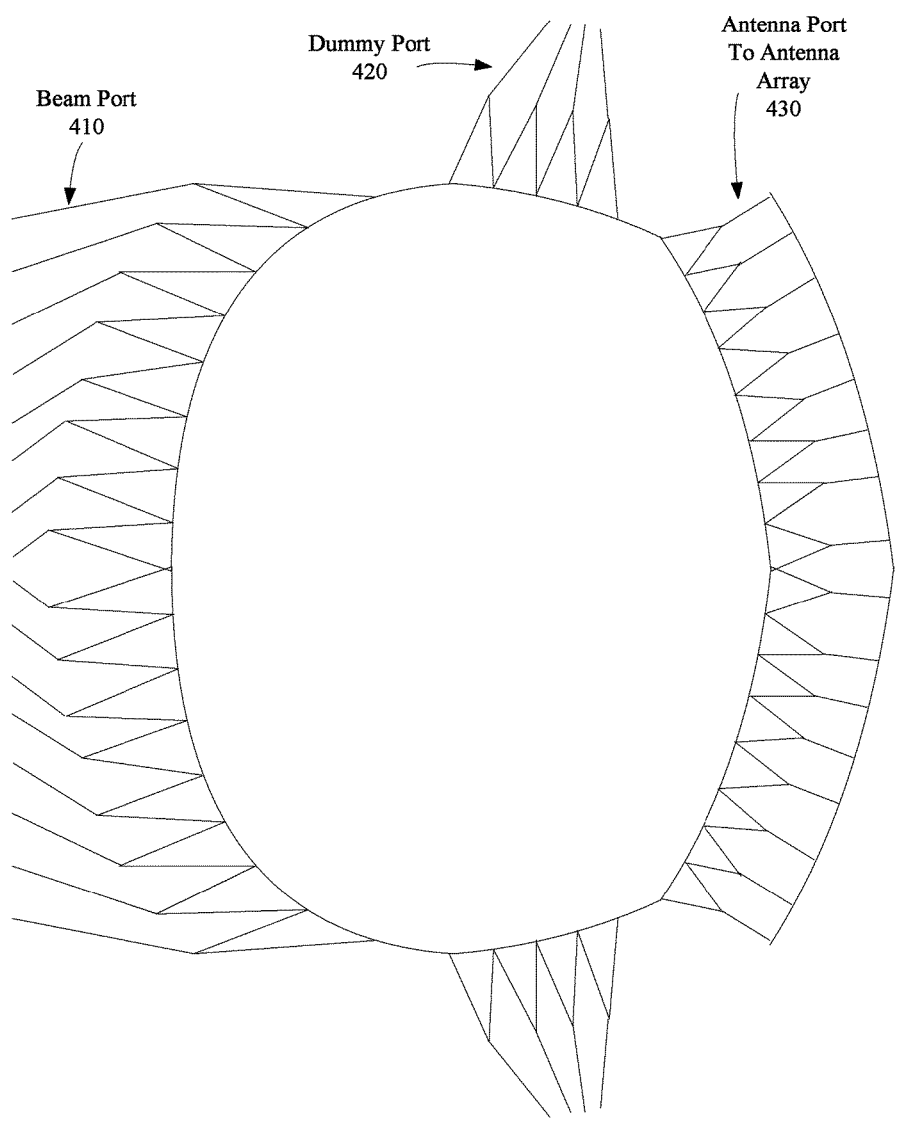
FIG. 4 shows a passive time-delay structure that includes a Rotman lens, according to an embodiment.

FIG. 4 shows a passive time-delay structure that includes a Rotman lens, according to an embodiment. As shown, the Rotman lens receives at a beam port 410 a plurality of input signals (16 are shown) and produces a plurality of output signals (16 are shown) at an antenna port 430. The plurality of output signals are connected to an antenna array, which forms beamforming pattern according to the delays introduced by the Rotman lens.

The Rotman lens is a true time-delay passive structure that enables an antenna array to generate multiple simultaneous fixed beams using a shared aperture. For an embodiment, the Rotman lens allows multiple antenna beams to be formed without the need for switches or phase shifters. For an embodiment, antenna elements are connected to the antenna port 430 with input signals connected to the beam port 410.

When the antenna elements of the antenna array are provided with electromagnetic signals at phases that vary linearly across a row, the antenna array behaves like a phased array.

One noteworthy property of the Rotman lens is that even though there are many ports connected to the Rotman lens, the ports are isolated, in that loading of one port does not affect the loss (or noise figure) of beams of adjacent ports. The Rotman lens is more like a parallel-plate waveguide than a transmission line.

For an embodiment, the Rotman lens is planar, and can be implemented on a printed circuit board (PCB). For an embodiment, the Rotman lens and the antenna array are formed on different layers of a multiple layer PCB.

While the Rotman lens implementation of a passive beam former has been described, it is to be understood that other implementations of the passive beamformer are possible. For example, a Butler matrix could be used as the passive beamformer. A Butler matrix is a type of beamforming network. Depending on which of N inputs is accessed, the antenna beam is steered in a specific direction in one plane; Butler matrices, Rotman Lenses and other passive beamformers can be combined in multiple "layers" to create multiple beams in 2 dimensions. The Butler matrix performs a similar function to a Rotman lens, or a phased array antenna system. Typically, the butler matrix includes phase shifters. In contrast to the Rotman lens that provides a true time delay, the phase shifters of the Butler matrix can suffer from frequency selectivity. That is, the delay may vary according to the frequency of the signal passing through the phase shifters.

For an embodiment, the dummy ports 420 are terminated to prevent or reduce reflections. Further, as will be described, tuning can be utilized to effect the reflections and the dummy ports 420.

Figure 5:
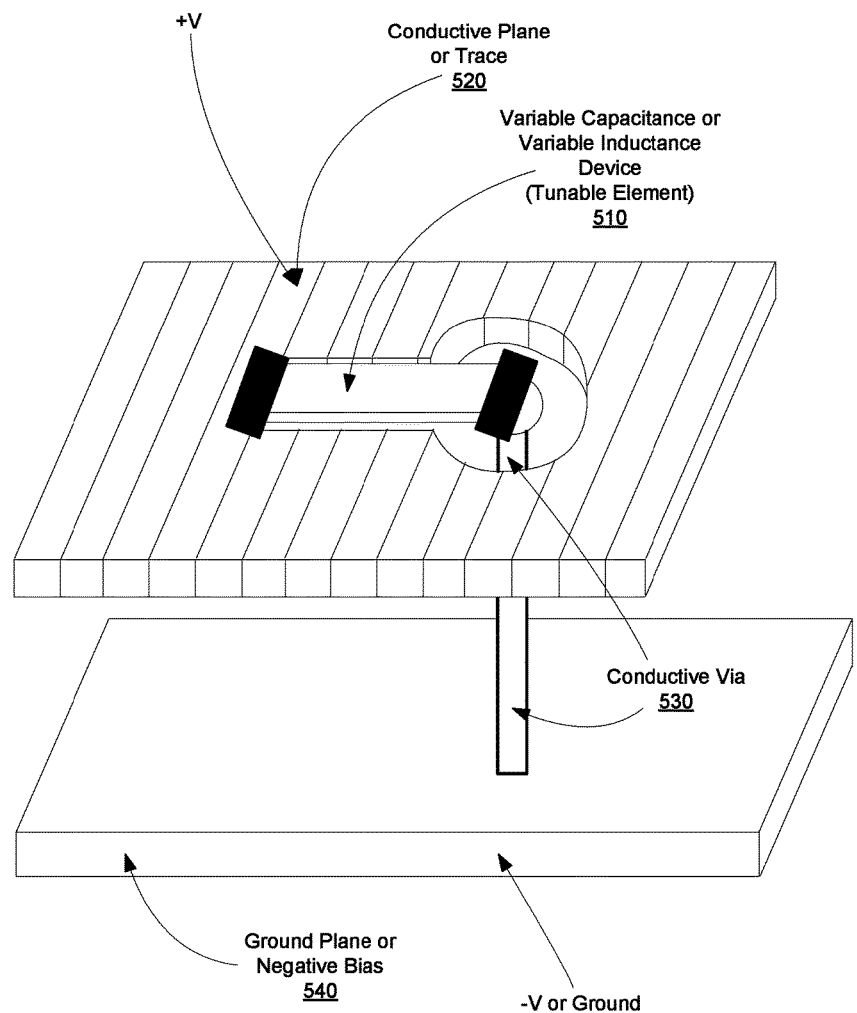
FIG. 5 shows a tunable element of a Rotman lens, according to an embodiment.

FIG. 5 shows a tunable element of a Rotman lens, according to an embodiment. For an embodiment, the tunable element facilitates dynamic re-configurability of the signal delays of the Rotman lens. The tunable element operates to introduce a variable delay to an electromagnetic signal propagating through the Rotman lens. The adjustment provided by the tunable elements effectively adjusts an effective operating size or effective electrical size of the Rotman lens.

For an embodiment, the tunable element includes an adjustable capacitor, wherein the capacitance of the tunable element is adjustable. The tunable capacitance tunes the effective permittivity of the medium through which an electromagnetic wave propagates within the Rotman lens.

For an embodiment, the tunable element includes a varicap diode, a varactor diode, a variable capacitance diode, a variable reactance diode or a tuning diode. These types of diode are designed to exploit the voltage-dependent capacitance of a reversed-biased p-n junction.

For an embodiment, the tunable element is a form of an adjustable reactance. That is, for an embodiment the tunable element includes an adjustable capacitance or/and an adjustable inductance. The tunable element effectively tunes, respectively, the effective permittivity or permeability of the medium through which an electromagnetic wave propagates within the Rotman lens.

For the embodiment shown in FIG. 5, a voltage (V+) is applied to one end of the tunable element 510 through a conductive plane or trace 520. The other end of the tunable element is connected to a ground or negatively biased conductive trace or plane 540 through a conductive via 530. Accordingly, the reactance of the tunable element 510 is adjusted by varying the applied voltage V+.

Figure 6:
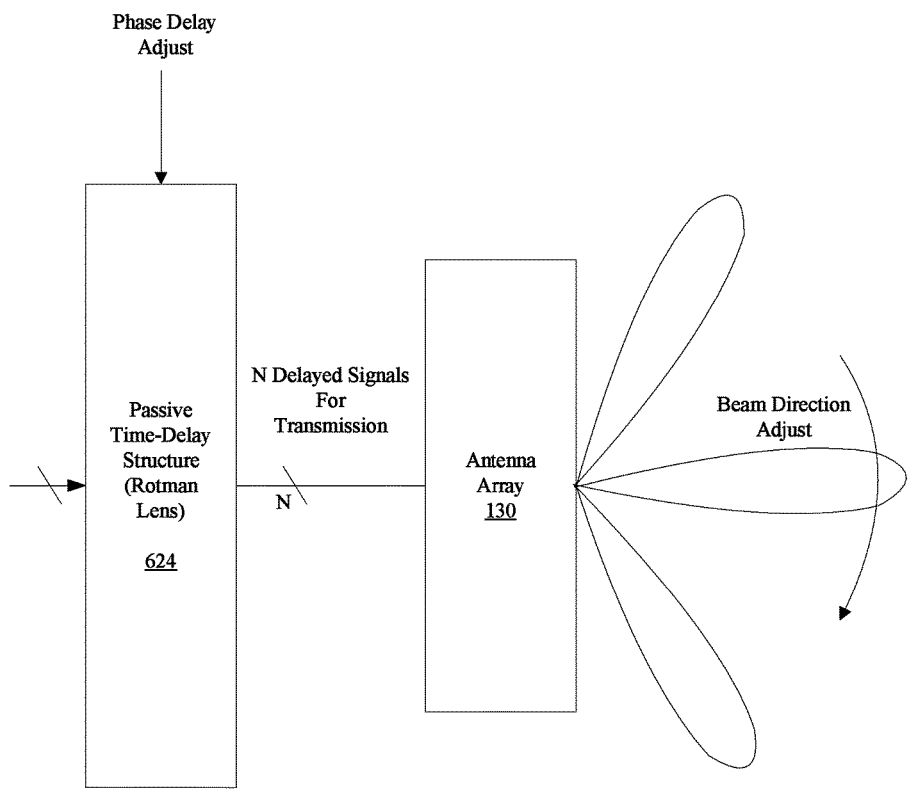
FIG. 6 shows a tunable passive time-delay structure that adaptively adjusts a beamforming pattern formed by an antenna array, according to an embodiment.

FIG. 6 shows a tunable passive time-delay structure that adaptively adjusts a beamforming pattern formed by an antenna array, according to an embodiment. One or more of the tunable elements (such as, tunable element 510) can be included with a Rotman lens to provide an adaptively adjustable delay of signal propagating through the Rotman lens, which provides tuning of directions of beams of the beamforming pattern formed by the antenna array 130 that is connected to the outputs of the Rotman lens. Accordingly, wireless links can be created between the beamforming system and selected targets by adjusting the tuning of the time delays through the Rotman lens.

FIG. 6 shows a phase delay adjust control of the passive time-delay structure 624. The phase delay adjust can include a single control line or many control lines that adjust one or more of the tunable elements of the passive time-delay structure 624. One or more beams of the antenna pattern formed by the antenna array is tunable and the direction of the one or more beams changes depending upon the tuning (phase delay adjust).

Figure 7:
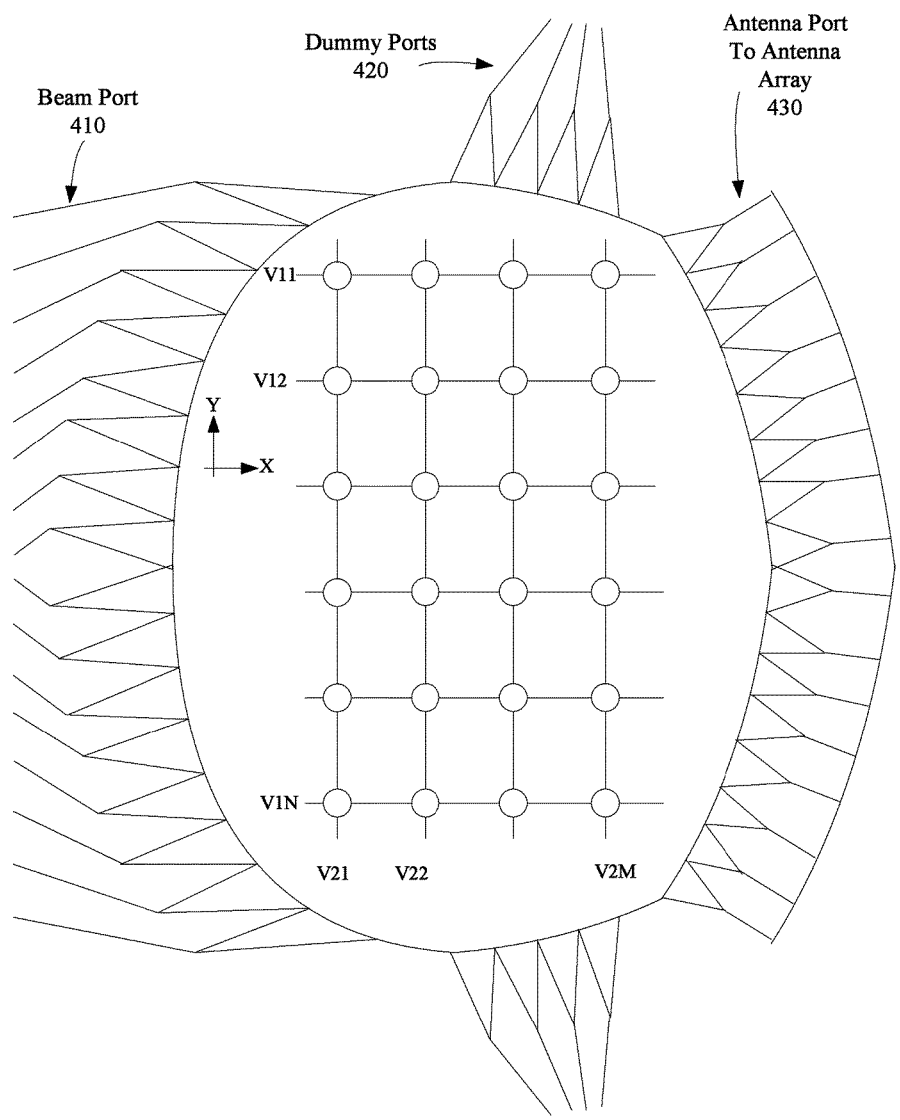
FIG. 7 shows a Rotman lens that includes an array of tunable elements that provide multiple delay adjustments of the Rotman lens, according to an embodiment.

FIG. 7 shows a Rotman lens that includes multiple delay adjustments, according to an embodiment. As shown, an array of tunable elements is formed across the Rotman lens. Each tunable element influences the delay of an electromagnetic signal propagating through the Rotman lens. As previously described, the reactance of each of the tunable elements is adjustable through, for example, the application of a bias voltage. For an array of tunable elements, a bias voltage can be applied to each of the tunable elements through a conductive plane or a conductive trace. FIG. 7 shows an array of conductive traces connected to each of the tunable elements.

For an embodiment, the biasing of all of the tunable elements is controlled by a single control line, and the delay associated with each path propagating through the Rotman lens is simultaneously adjusted.

For an embodiment, the biasing of the tunable elements is controlled by multiple control lines. For an embodiment, one or more of the multiple control lines control the bias of groups of tunable elements. For example, a plurality of control lines can control lines of elements oriented in the x-direction, and/or lines of elements oriented in the y-direction. Further, for an embodiment, each tunable element is individually controlled by a plurality of control lines. That is, for example, x and y lines are routed to each element to provide refined control.

For an embodiment, a plurality of the x-oriented control lines simultaneously apply a common or same voltage while varying voltages are applied across a plurality of y-oriented control lines, thereby forming a gradient across the Rotman lens in the y-direction. For an embodiment, a plurality of the y-oriented control lines simultaneously apply a common or same voltage while varying voltages are applied across a plurality of x-oriented control lines, thereby forming a gradient across the Rotman lens in the x-direction. It is to be understood that the x and y orientations are being used to provide an example of orientations for descriptive purposes.

As previously mentioned, select tunable elements can be tuned to reduce reflections at the dummy ports 420.

Figure 8:
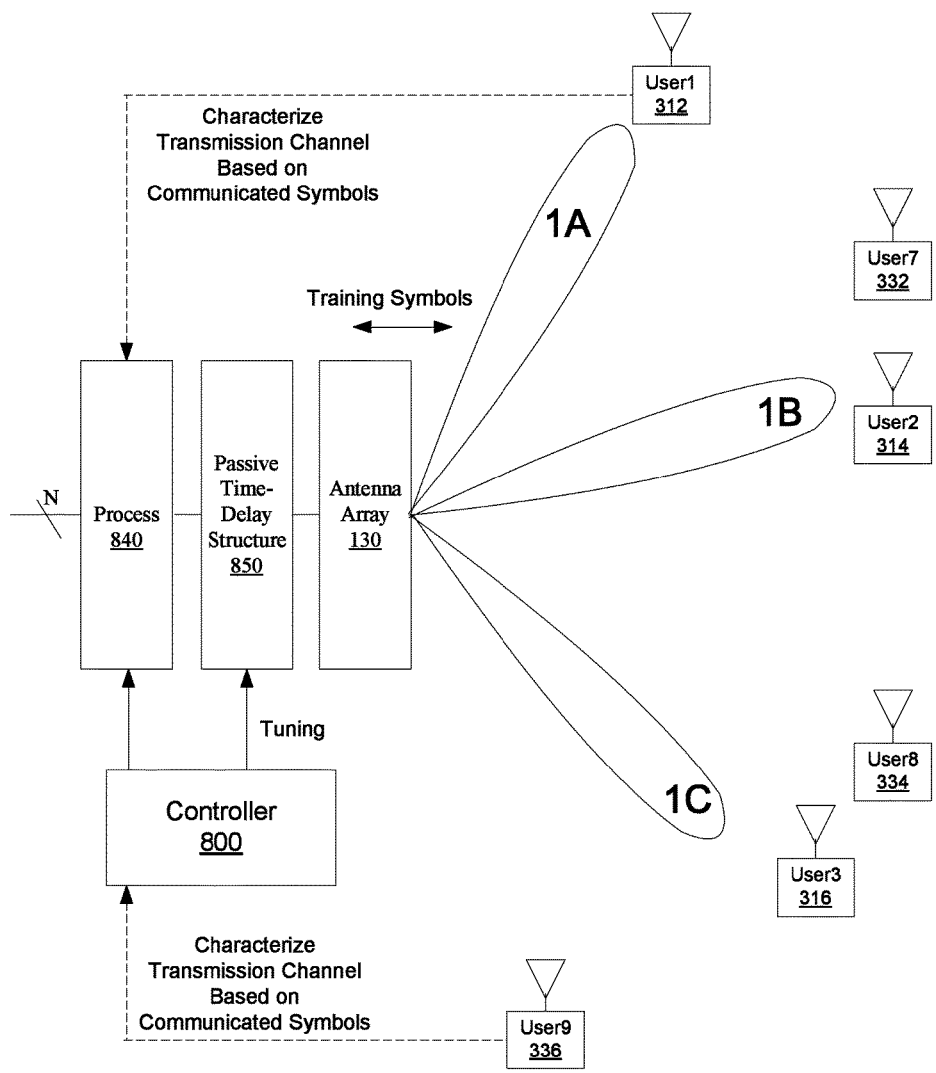
FIG. 8 shows a beamforming system wherein transmission channels between the beamforming system and multiple users are simultaneously characterized, according to an embodiment.

FIG. 8 shows a beamforming system wherein transmission channels between the beamforming system and multiple users are simultaneously characterized, according to an embodiment. For an embodiment, training symbols are transmitted through one or more of the tuning selections of the passive time-delay structure 850. A subset of users that receive the training symbols measure characteristics of the received training symbols. Owing to the fact that characteristics of the training symbols before transmission are known, characteristics of the transmission channel between the antenna array of the beamforming system and each of the users can be characterized by comparing the known characteristics of the transmitted training symbols with the measured characteristics of the received training symbols. The training can be performed for multiple tuning selections of the passive time-delay structure 850.

For an embodiment, communication between the beamforming system and the users is scheduled. For an embodiment, training of the communication channels between the beamforming system and multiple users is simultaneously scheduled and simultaneously performed. That is, for a particular selectable beamforming pattern, a specific set of users are located to allow communication between the beamforming system and specific set of users. That is, the beams formed by the tuning selections of the passive time-delay structure are directed to support wireless communication between the beamforming system and specific set of users. Accordingly, training of the communication channels between the beamforming system and each of the specific set of users can be simultaneously performed for each setting of the tuning selections of the passive time-delay structure 850.

After characterization of the communication channels between the beamforming system and each of the specific set of users, the communication between the beamforming system and each of the specific set of users can be scheduled according to TDMA (time division multiple access). That is, the characterizations of the each of the communication channels can be used to influence processing 840 of communication between the beamforming system and each of the users, and time slots can be allocated for wireless communication between beamforming system and each of the users. The processed signals are input to passive time-delay structure 850 which is tuned for communication with a selected set of transceivers.

For an embodiment, training of the communication channels between the beamforming system and multiple users is simultaneously scheduled and simultaneously performed for multiple tuning selections of the passive time-delay structure 850. That is, for example, the communication channel between the beamforming system and user 312 can be characterized for passive time-delay structure that results in a first (1A) beamforming pattern, and the communication channels between the beamforming system and multiple user 314 can be characterized for passive time-delay structure that results in a second (1B) beamforming pattern. As previously described, each tuning of the passive time-delay structure includes a different beamforming pattern and includes one or more beams formed between the beamforming system and a different set of users.

Subsequently, a tuning selection of the passive time-delay structure may be selected, and the corresponding channel characterizations used to enable wireless communication between the beamforming system and selected users.

While for at least some embodiments the channel characterizations is used for determining tuning of the passive time-delay structure for communication with select users, at least some embodiments include tuning a one or a selected one of the passive time delay based at least on the channel characterizations. That is, the tuning of beam directions as shown in FIG. 6 can be based at least in part on the channel characterizations. That is, a direction of one or more beams can be tuned to provide a better wireless link between the beamforming system and one or more users.

FIG. 8 includes a controller 800 that can be located either within a node of the beamforming system, or external to the beamforming system. The controller 800 can either characterize the communication channels between the node and one or more of the users (transceivers, such as, users (transceivers 312, 314, 316), receive the characterizations of the communication channels, or receive information that allows the controller 800 to determine the characterization of the communication channels. Based on the communication channel characterizations, the controller 800 at least one of tunes the passive time-delay structure and/or aids processing (840) of transmission signals or processing of received signals.

Figure 9:
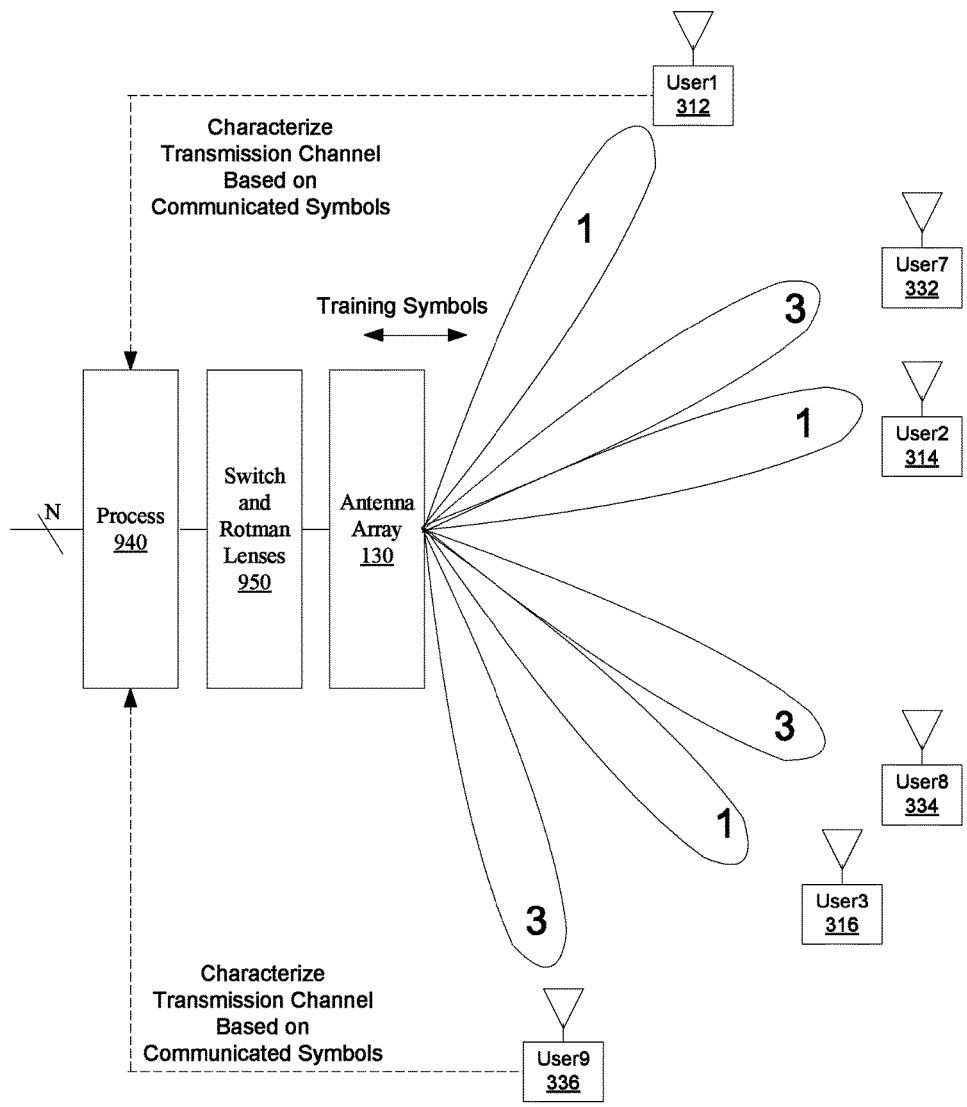
FIG. 9 shows a beamforming system wherein transmission channels between the beamforming system and multiple users are simultaneously characterized, according to another embodiment.

FIG. 9 shows a beamforming system wherein transmission channels between the beamforming system and multiple users are simultaneously characterized, according to another embodiment. For an embodiment, training symbols are transmitted through one or more of the selectable beamforming patterns. A subset of users that receive the training symbols measure characteristics of the received training symbols. Owing to the fact that characteristics of the training symbols before transmission are known, characteristics of the transmission channel between the antenna array of the beamforming system and each of the users can be characterized by comparing the known characteristics of the transmitted training symbols with the measured characteristics of the received training symbols.

For an embodiment, communication between the beamforming system and the users is scheduled. For an embodiment, training of the communication channels between the beamforming system and multiple users is simultaneously scheduled and simultaneously performed. That is, for a particular selectable beamforming pattern, a specific set of users are located to allow communication between the beamforming system and specific set of users. That is, the beams formed by the particular selectable beamforming pattern are directed to support wireless communication between the beamforming system and specific set of users. Accordingly, training of the communication channels between the beamforming system and each of the specific set of users can be simultaneously performed.

After characterization of the communication channels between the beamforming system and each of the specific set of users, the communication between the beamforming system and each of the specific set of users can be scheduled according to TDMA (time division multiple access). That is, the characterizations of the each of the communication channels can be used to influence processing 940 of communication between the beamforming system and each of the users, and time slots can be allocated for wireless communication between beamforming system and each of the users. The processed signals are input to the input switch and Rotman lenses 950. Additionally, or alternatively, received signals are delayed by the Rotman lenses 950, and the processing 940 is on delayed received signals.

For an embodiment, training of the communication channels between the beamforming system and multiple users is simultaneously scheduled and simultaneously performed for multiple selections of passive time-delay structure. That is, for example, the communication channels between the beamforming system and multiple users 312, 314, 316 can be characterized for passive time-delay structure that results in a first (1) beamforming pattern, and the communication channels between the beamforming system and multiple users 332, 334, 336 can be characterized for passive time-delay structure that results in a third (3) beamforming pattern. As previously described, each of the passive time-delay structures may include a different beamforming pattern and include beams formed between the beamforming system and a different set of users.

For an embodiment, the training or characterization of the communication channels between the beamforming system is determined based on training signals transmitted from the beamforming system to the users (transceivers). However, for an other embodiment, the training or characterization of the communication channels between the beamforming system is determined based on training signals transmitted from the users to the beamforming system.

Subsequently, a one of the passive time-delay structures may be selected, and the corresponding channel characterizations used to enable wireless communication between the beamforming system and selected users.

While for at least some embodiments the channel characterizations is used for determining which passive time-delay structure to select for communication with a select users, at least some embodiments include tuning a one or a selected one of the passive time delay based at least on the channel characterizations. That is, the tuning of beam directions as shown in FIG. 6 can be based at least in part on the channel characterizations. That is, a direction of one or more beams can be tuned to provide a better wireless link between the beamforming system and one or more users.

Figure 10:
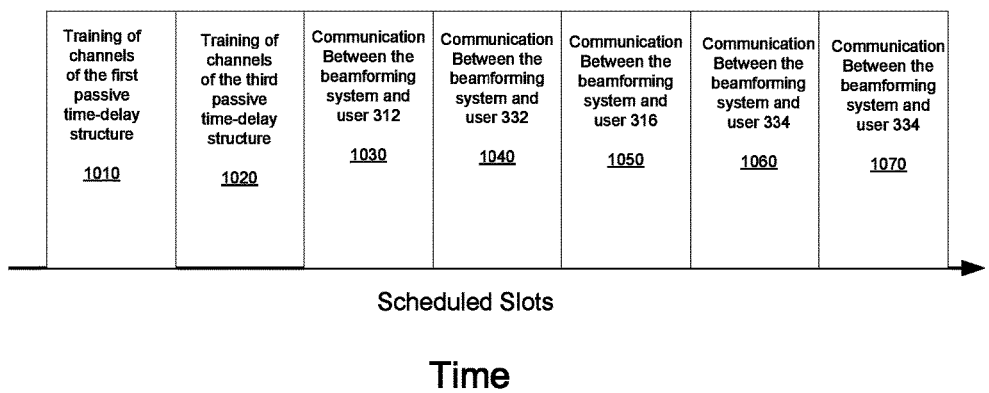
FIG. 10 shows a schedule of channel training between a beamforming system and multiple users, and communication between the beamforming system and multiple users, according to an embodiment.

FIG. 10 shows a schedule of channel training between a beamforming system and multiple users, and communication between the beamforming system and multiple users, according to an embodiment. As previously described, the multiple communication channels between the beamforming system and multiple users can be simultaneously characterized. A first time slot 1010 can include scheduled characterization of multiple channels supported by a first passive time-delay structure of the beamforming system. A second time slot 1020 can include scheduled characterization of multiple channels supported by a third passive time-delay structure of the beamforming system. A third time slot 1030 can include scheduled communication with a user 312, in which the communication can be pre-processed using a channel characterization determined through the scheduled characterization of the first time slot 1010. A fourth time slot 1040 can include scheduled communication with a user 332, in which the communication can be pre-processed using a channel characterization determined through the scheduled characterization of the second time slot 1020. A fifth time slot 1050 can include scheduled communication with a user 316, in which the communication can be pre-processed using a channel characterization determined through the scheduled characterization of the first time slot 1010. A sixth time slot 1060 can include scheduled communication with a user 334, in which the communication can be pre-processed using a channel characterization determined through the scheduled characterization of the second time slot 1020. A seventh time slot 1070 can again include scheduled communication with a user 334, in which the communication can be pre-processed using a channel characterization determined through the scheduled characterization of the second time slot 1020.

The proposed scheduling in merely an example that illustrates that multiple channels of a passive time-delay structure can be simultaneously characterized, and the channel characterizations can be utilized for preprocessing of communication to individual users utilizing the passive time-delay structure.

Figure 11:
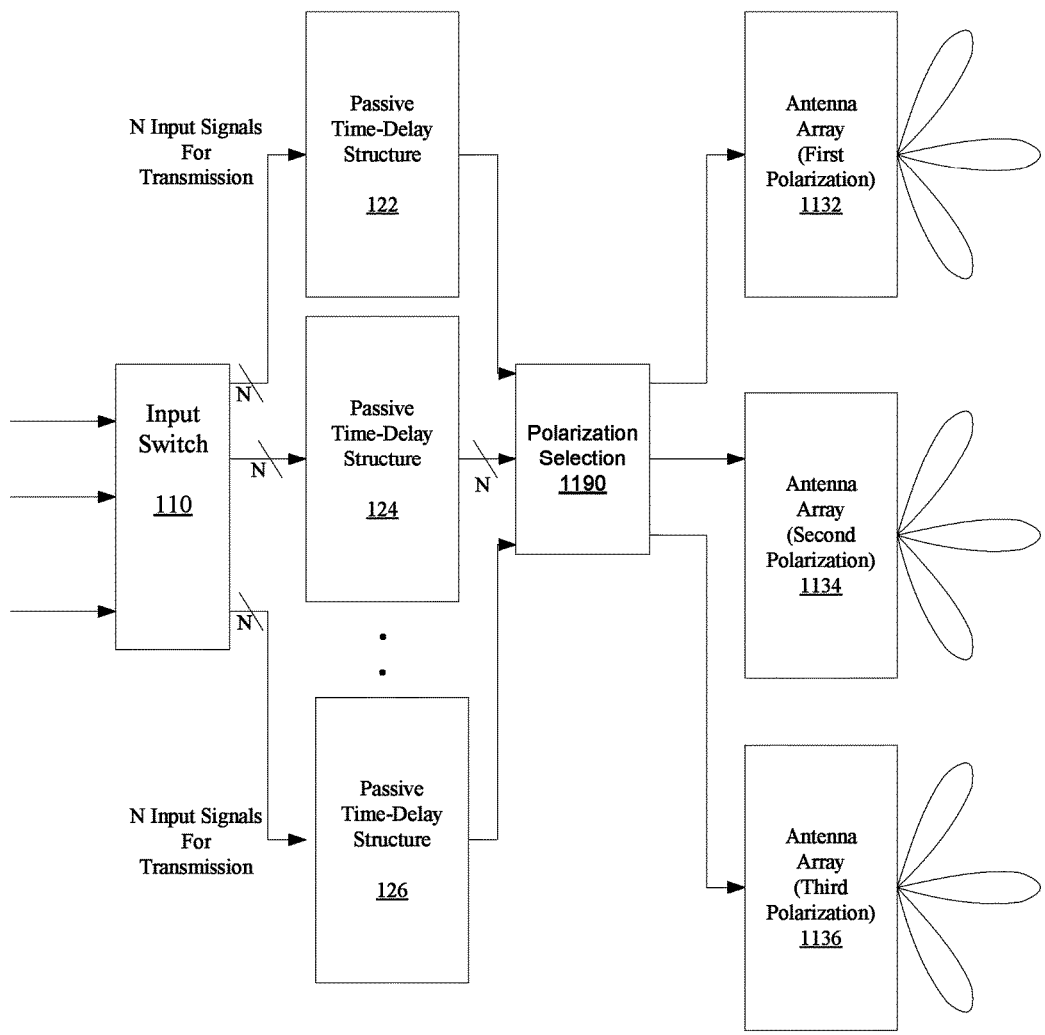
FIG. 11 shows a beamforming system that includes multiple polarizations of the antenna array, according to an embodiment.

FIG. 11 shows a beamforming system that includes multiple polarizations of the antenna array, according to an embodiment. For an embodiment, the passive time-delay structure can be selected to generate beamforming patterns having different polarizations. The inclusion of antenna arrays having multiple polarizations allows for increased throughput through available transmission channels by allowing for simultaneous communication over the multiple polarizations. Further, interference can be mitigated. Various types of polarization may include right and left circular polarization, and/or horizontal and vertical linear polarization.

As shown, an embodiment includes a polarization selection 1190 that connects the passive time-delay structures to a corresponding one of a plurality polarizations (1132, 1134, 1136) of the antenna array. That is, each of the polarizations (1132, 1134, 1136) for a beamforming pattern having a corresponding polarization. An embodiment does not include the polarization selection 1190 as the passive time-delay structures can be directly connected to the different polarizations (1132, 1134, 1136) of the antenna array.

Figure 18:
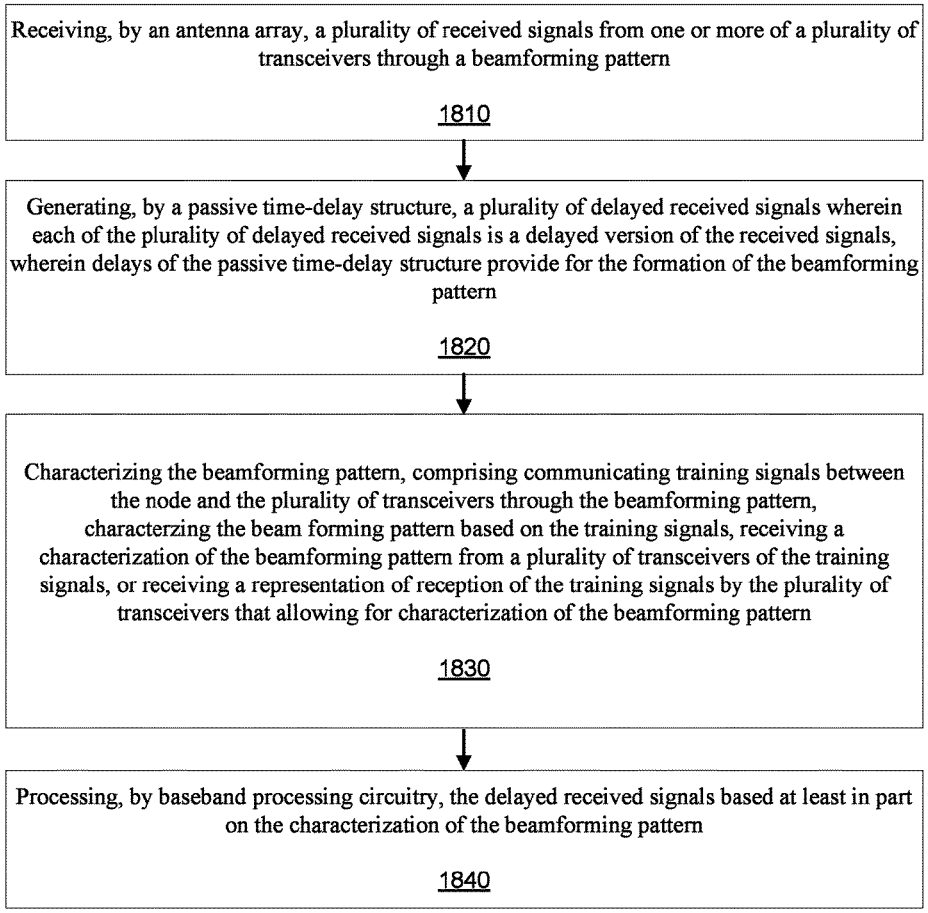
FIG. 18 is a flow chart that includes steps of a method of processing beamforming signals of a passive time-delay structure, according to another embodiment.

While FIG. 11 shows an input switch 110, it is to be understood that this switch can be located elsewhere as long as the switch provides selectivity between the passive time-delay structures. For example, FIG. 18 shows another switch location. Further, while shown as transmitting signals from the beamforming system, it is to be understood that FIG. 11 can additionally or alternatively be used for receiving communication signals from transceivers through beams formed by the antenna patterns created by the combination of the selected passive time-delay structure and the antenna arrays 1132, 1134, 1136.

Figure 12:
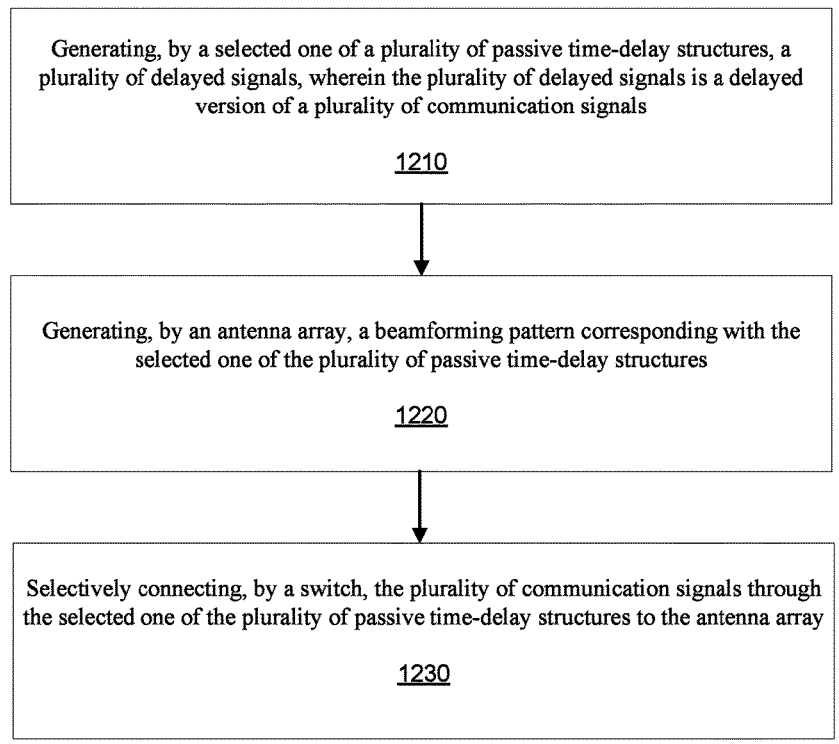
FIG. 12 is a flow chart that includes steps of a method of beamforming to multiple users using switched passive time-delay structures, according to an embodiment.

FIG. 12 is a flow chart that includes steps of a method of beamforming to multiple users using switched passive time-delay structures, according to an embodiment. A first step 1210 includes generating, by a selected one of a plurality of passive time-delay structures, a plurality of delayed signals, wherein the plurality of delayed signals is a delayed version of a plurality of communication signals. A second step 1220 includes generating, by an antenna array, a beamforming pattern corresponding with the selected one of the plurality of passive time-delay structures. A third step 1230 includes selectively connecting, by a switch, the plurality of communication signals through the selected one of the plurality of passive time-delay structures to the antenna array.

For at least some embodiments, the beamforming pattern formed by selection of each of the plurality of passive time-delay structures is different than a beamforming pattern formed by selection of each other of the plurality of passive time-delay structures.

For at least some embodiments, at least one of the plurality of passive time-delay structures comprises a Rotman lens that receives the input signals and generates the plurality of output signals. For at least some embodiments, each of the Rotman lenses includes a dielectric constant that influences delays of input signals propagating through the Rotman lens. At least some embodiments further include adaptively adjusting the dielectric of at least one Roman lens to change the delays of the input signals propagating through the Rotman lens. At least some embodiments further include varying a value of the dielectric of at least one Rotman lens across the Rotman lens.

For at least some embodiments, each Rotman lens includes lumped capacitances, and further comprising adjusting the antenna pattern formed by the antenna array by adjusting values of the lumped capacitances.

For at least some embodiments, at least one of the plurality of passive time-delay structures drives array of antennas to form a beam having a different polarization than a beam formed by a different one of the plurality of passive time-delay structures.

At least some embodiments further include selecting which of the plurality of passive time-delay structures that the plurality of input signals are connected to based at least in part on feedback from one or more transceivers.

Figure 13:
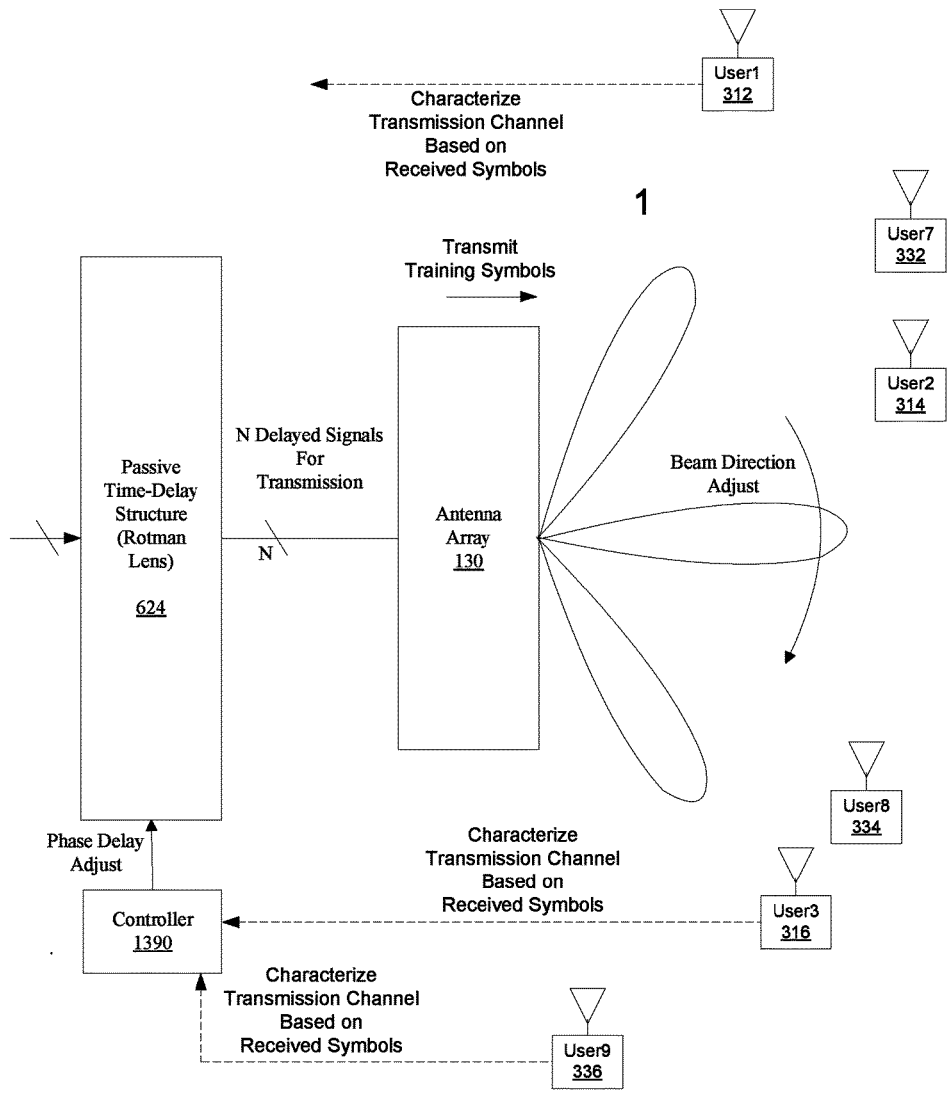
FIG. 13 shows a beamforming system wherein transmission channels between the beamforming system and multiple users are simultaneously characterized, according to another embodiment.

FIG. 13 shows a beamforming system wherein transmission channels between the beamforming system and multiple users are simultaneously characterized, according to another embodiment. FIG. 13 is similar to FIG. 8, but further includes a controller 1390 that receives the channel characterizations and tunes the passive time-delay structure 624. The tuning can be adjusted to direct the beam 1 to a desired one or more users. As previously described, the transmission channels between the beamforming system and multiple transceivers can be characterized simultaneously. Further, the tuning needed to communicate with particular transceivers can be determined based on the channel characterizations.

Figure 14:
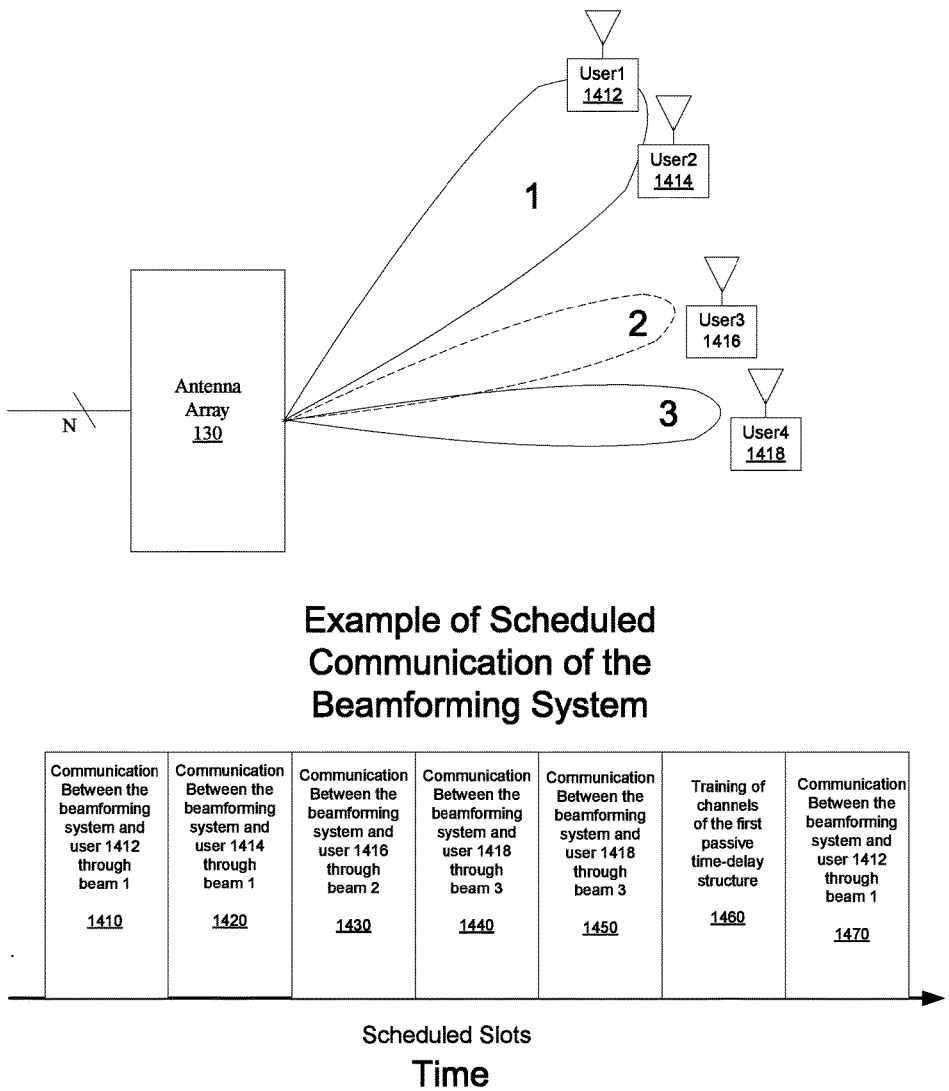
FIG. 14 shows scheduled communication between a wireless node a plurality of transceivers, according to an embodiment.

FIG. 14 shows scheduled communication between a wireless node a plurality of transceivers, according to an embodiment. FIG. 14 shows that an antenna beamforming pattern may include beams directed to one or more transceivers. For example, a first beam 1 can be used for communicating with user1 1412 and user 2 1414. A second beam 2 can be used for communicating with a user3 1416, and a third beam 3 can be used for communicating with a user4 1418.

Further, FIG. 14 shows an example of possible scheduling of communication between the wireless node and the transceivers. A first time slot 1410 include communicating between the beamforming system of the node and the user1 1412 through the first beam 1. A second time slot 1420 include communicating between the beamforming system of the node and the user2 1414 through the first beam 1. A third time slot 1430 include communicating between the beamforming system of the node and the user3 1416 through the second beam 2. A fourth time slot 1440 include communicating between the beamforming system of the node and the user4 1418 through the third beam 3. A fifth time slot 1450 include simultaneous training (transmission of training signals (training symbols)) with the transceivers. A sixth time slot 1460 include communicating between the beamforming system of the node and the user1 1412 through the first beam 1.

Figure 15:
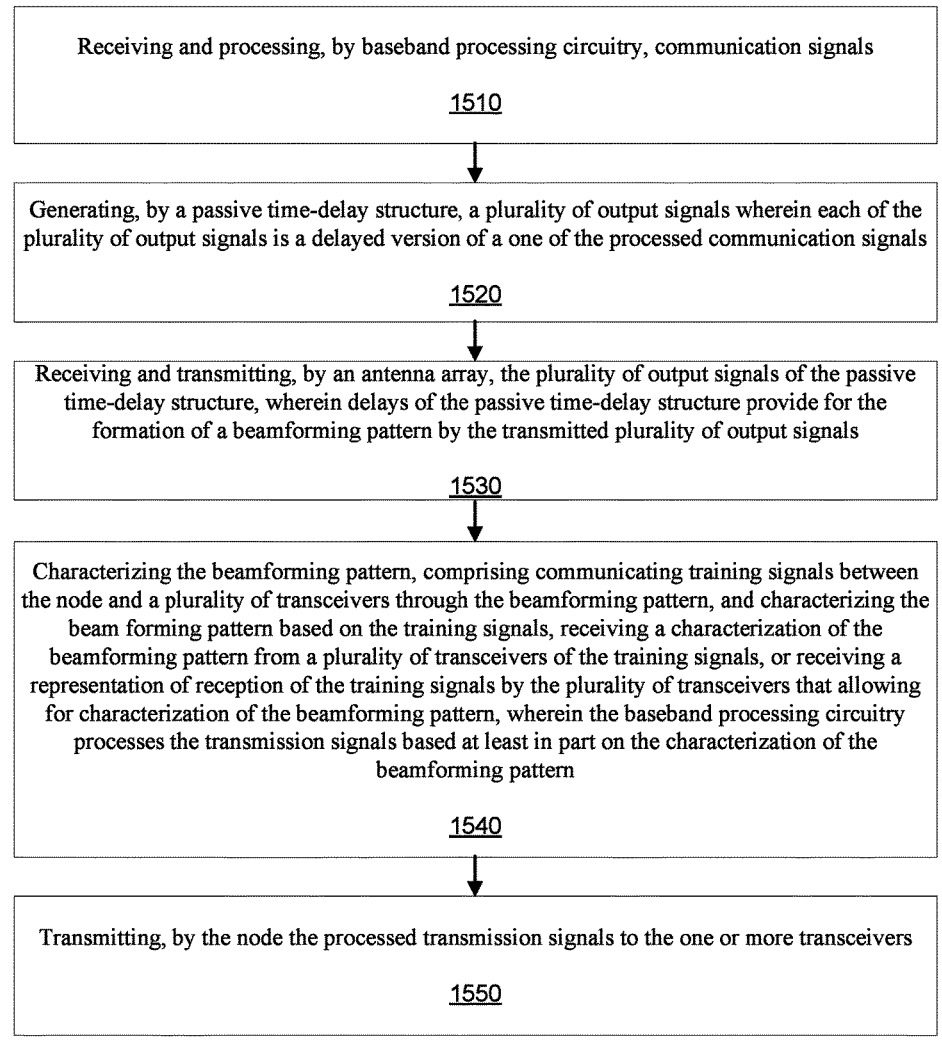
FIG. 15 is a flow chart that includes steps of a method of processing beamforming signals of a passive time-delay structure, according to an embodiment.

FIG. 15 is a flow chart that includes steps of a method of processing beamforming signals of a passive time-delay structure, according to an embodiment. A first step 1510 includes receiving and processing, by baseband processing circuitry, communication signals. A second step 1520 includes generating, by a passive time-delay structure, a plurality of output signals wherein each of the plurality of output signals is a delayed version of a one of the processed communication signals. A third step 1530 includes receiving and transmitting, by an antenna array, the plurality of output signals of the passive time-delay structure, wherein delays of the passive time-delay structure provide for the formation of a beamforming pattern by the transmitted plurality of output signals. A fourth step 1540 includes characterizing the beamforming pattern, including communicating training signals between the node and a plurality of transceivers through the beamforming pattern, and characterizing the beam forming pattern based on the training signals, receiving a characterization of the beamforming pattern from a plurality of transceivers of the training signals, or receiving a representation of reception of the training signals by the plurality of transceivers that allowing for characterization of the beamforming pattern, wherein the baseband processing circuitry processes the transmission signals based at least in part on the characterization of the beamforming pattern. A fifth step 1550 includes transmitting, by the node the processed transmission signals to the one or more transceivers.

As previously described, an embodiment includes transmitting the training signals simultaneously to the plurality of transceivers, and transmitting the processed signals to different of the different plurality of transceivers at different times.

As previously described, for an embodiment the passive time-delay structure includes a Rotman lens. For an embodiment, the Rotman lens includes a dielectric, and adjusting the beamforming pattern includes adjusting the dielectric. Further, at least some embodiments further include characterizing the beamforming pattern by adjusting the beamforming pattern comprising adjusting the dielectric of the Roman lens, communicating training signals between the node and one or more transceivers through the adjusted beamforming pattern, and characterizing the adjusted beamforming pattern, receiving a characterization of the adjusted beamforming pattern from a plurality of transceivers of the training signals, or receiving a representation of reception of the training signals by the plurality of transceivers that allows the controller to generate the characterization of the beamforming pattern.

As previously described, at least some embodiment further include selectably connecting the processed transmission signals to a one of a plurality of passive time-delay structures, wherein each of the plurality of passive time-delay structures correspond with a one of a plurality of beamforming patterns formed by transmission of the processed signals. Further, at least some embodiments further include characterizing more than one of the plurality of beamforming patterns, receiving a characterizations of more than one of the plurality of beamforming patterns from one or more transceivers of the training signals, or receiving a representation of reception of the training signals that allows the controller to generate the characterizations of more than one of the plurality of beamforming patterns.

Further, at least some embodiments further include selecting which of passive time-delay structures to receive the processed transmission signals based on which one or more transceivers the node is communicating with, and characterizations of the beamforming patterns.

Further, at least some embodiments further include reselecting which of the passive time-delay structures to receive the processed transmission signals upon determination that one or more of the transceiver is receiving communication signals from the node having a receive quality below a threshold.

Figure 16:
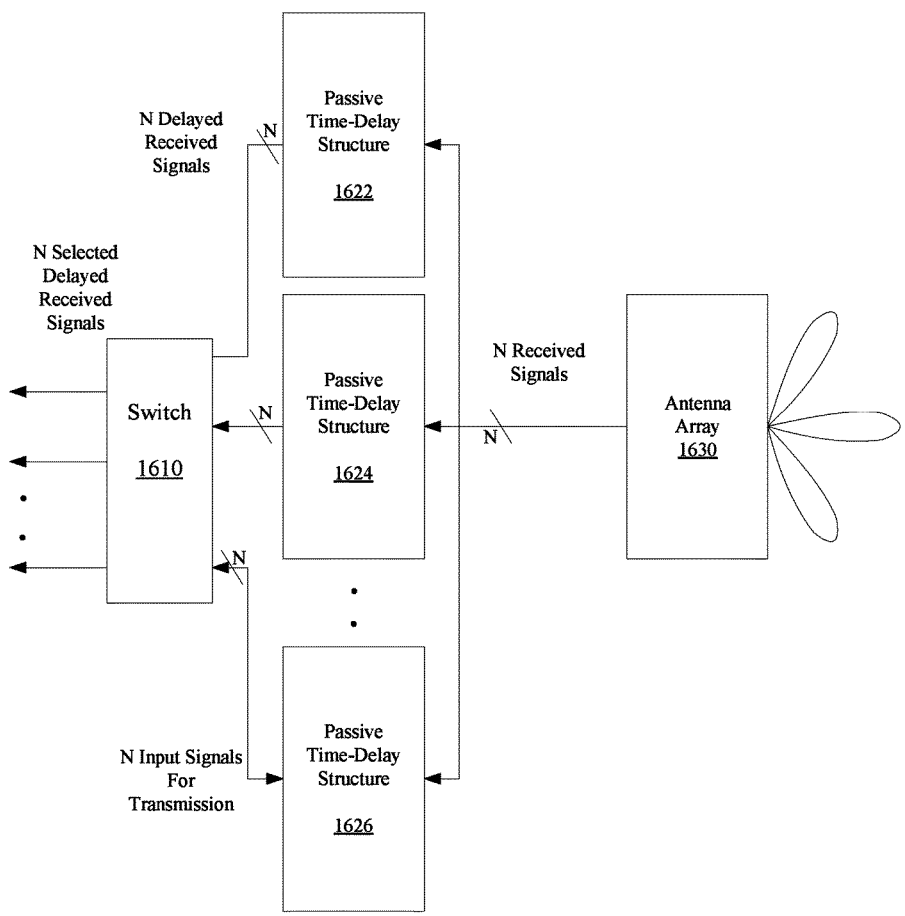
FIG. 16 shows a wireless node that includes passive time-delay structures and receives communication signals from a plurality of transceivers, according to an embodiment.

FIG. 16 shows a wireless node that receives communication signals from a plurality of transceivers, according to an embodiment. As shown, wireless signals are received through the beamforming pattern formed by the selected passive time-delay structures 1622, 1624, 1626 and the antenna array 1630. A switch 160 provides the selection between the passive time-delay structures 1622, 1624, 1626. As previously described, the switch 1610 can be located on the opposite side of the passive time-delay structures 1622, 1624, 1626 (as shown in FIG. 18) as long as the switch provide the selectivity between the passive time-delay structures 1622, 1624, 1626. Further, as previously described, an embodiment includes a tuning of the delay through one or more of the passive time-delay structures 1622, 1624, 1626. Further, an embodiment includes a single passive time-delay structure wherein a delay of the single passive time-delay structure is tunable.

Figure 17:
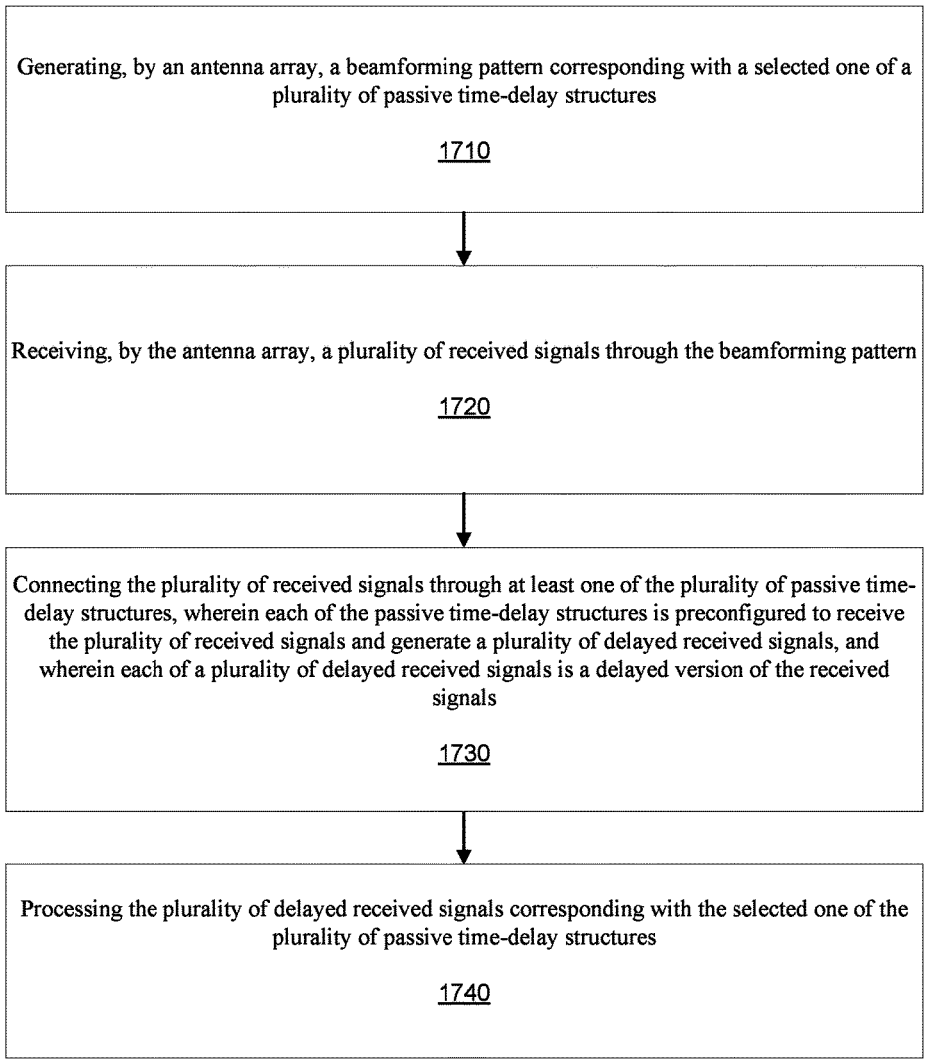
FIG. 17 is a flow chart that includes steps of a method of a wireless node utilizing switched passive time-delay structures for receiving communication signals from a plurality of transceivers, according to an embodiment.

FIG. 17 is a flow chart that includes steps of a method of a wireless node utilizing switched passive time-delay structures for receiving communication signals from a plurality of transceivers, according to an embodiment. A first step 1710 includes generating, by an antenna array, a beamforming pattern corresponding with a selected one of a plurality of passive time-delay structures. A second step 1720 includes receiving, by the antenna array, a plurality of received signals through the beamforming pattern. A third step 1730 includes connecting the plurality of received signals through at least one of the plurality of passive time-delay structures, wherein each of the passive time-delay structures is preconfigured to receive the plurality of received signals and generate a plurality of delayed received signals, and wherein each of a plurality of delayed received signals is a delayed version of the received signals; and processing the plurality of delayed received signals corresponding with the selected one of the plurality of passive time-delay structures. A fourth step 1740 includes processing the plurality of delayed received signals corresponding with the selected one of the plurality of passive time-delay structures FIG. 18 is a flow chart that includes steps of a method of processing beamforming signals of a passive time-delay structure, according to another embodiment. A first step 1810 includes receiving, by an antenna array, a plurality of received signals from one or more of a plurality of transceivers through a beamforming pattern. A second step 1820 includes generating, by a passive time-delay structure, a plurality of delayed received signals wherein each of the plurality of delayed received signals is a delayed version of the received signals, wherein delays of the passive time-delay structure provide for the formation of the beamforming pattern. A third step 1830 includes characterizing the beamforming pattern, comprising communicating training signals between the node and the plurality of transceivers through the beamforming pattern, characterizing the beam forming pattern based on the training signals, receiving a characterization of the beamforming pattern from a plurality of transceivers of the training signals, or receiving a representation of reception of the training signals by the plurality of transceivers that allowing for characterization of the beamforming pattern. A fourth step 1840 includes processing, by baseband processing circuitry, the delayed received signals based at least in part on the characterization of the beamforming pattern.

FIG. 19 shows a beamforming system that includes selectable passive time-delay structures, according to another embodiment. As previously described, the beamforming system includes a plurality of passive time-delay structures 1922, 1924, 1926, wherein each of the passive time-delay structures is preconfigured to provide a plurality of delayed signals, wherein each of the plurality of delayed signals is a delayed version of a one of a plurality of input (communication) signals. The a beamforming system further includes an antenna array 1930, wherein the antenna array generates a beamforming pattern corresponding with a selected one of the passive time-delay structures 1922, 1924, 1926. Further, the beamforming system includes a switch 1920, wherein the switch 1920 operates to selectively connect the plurality of input signals through the selected one of the plurality of passive time-delay structures 1922, 1924, 1926 to the antenna array 1930.

The switch that selectively connects the plurality of input signals through the selected one of the plurality of passive time-delay structures 1922, 1924, 1926 to the antenna array 1930 can be located in various locations, as long as it provides the selective connection. As shown in FIG. 19, the switch 1920 is located between the passive time-delay structures 1922, 1924, 1926 and the antenna array 1930. However, the switch can be located on the other sides of the passive time-delay structures 1922, 1924, 1926. As shown in FIG. 19, connections block 1920 includes connecting the N communication signals to each of the passive time-delay structures 1922, 1924, 1926, and the selected passive time-delay structure is connected through the switch 1920 to the antenna array 1930.

While the beamforming system of FIG. 9 is shown as transmitting signals through selected beamforming patterns of the passive time-delay structures 1922, 1924, 1926, as has been previously described, the same system is operable to receive signals through the selected beamforming patterns of the passive time-delay structures 1922, 1924, 1926.

Although specific embodiments have been described and illustrated, the embodiments are not to be limited to the specific forms or arrangements of parts so described and illustrated. The described embodiments are to only be limited by the claims.

What is claimed:

1. An apparatus, comprising:
   a plurality of passive time-delay structures, wherein each of the plurality of passive time-delay structures is operative to generate a plurality of delayed signals, wherein the plurality of delayed signals is a delayed version of a plurality of communication signals;
   an antenna array, wherein the antenna array generates a beamforming pattern corresponding with a selected one of the plurality of passive time-delay structures; and
   a switch, wherein the switch operates to selectively connect the plurality of communication signals through the selected one of the plurality of passive time-delay structures to the antenna array.

2. The apparatus of claim 1, wherein each of the plurality of time-delay structures delay the plurality of communication signals to create a corresponding beamforming pattern by the antenna array.

3. The apparatus of claim 2, wherein the corresponding beamforming pattern formed by selection of each of the plurality of passive time-delay structures is different than a beamforming pattern formed by selection of each other of the plurality of passive time-delay structures.

4. The apparatus of claim 1, wherein at least one of the plurality of passive time-delay structures comprises a Rotman lens that receives the plurality of communication signals and generates the plurality of delayed signals.

5. The apparatus of claim 4, wherein each of the Rotman lenses includes a dielectric constant that influences delays of communication signals propagating through the Rotman lens.

6. The apparatus of claim 5, wherein the dielectric of at least one Roman lens is adaptively adjusted to change the delays of the communication signals propagating through the Rotman lens.

7. The apparatus of claim 5, wherein a value of the dielectric of at least one Rotman lens is varied across Rotman lens.

8. The apparatus of claim 4, wherein each Rotman lens includes lumped capacitances distributed across the Rotman lens, and wherein adjusting the antenna pattern formed by the antenna array comprises adjusting values of the lumped capacitances.

9. The apparatus of claim 1, wherein at least one of the plurality of passive time-delay structures is connected to a one of a plurality of arrays of antennas to form a beam having a different polarization than a beam formed by a different one of the plurality of passive time-delay structures.

10. The apparatus of claim 1, wherein each of the plurality of passive time-delay structures is connected to a corresponding antenna array to form a beamforming pattern having a corresponding polarization.

11. The apparatus of claim 1, wherein the apparatus forms a portion of a transceiver, and selection of which of the plurality of passive time-delay structures that the plurality of communication signals are connected to is based at least in part on feedback from one or more other transceivers.

12. A method, comprising:
    generating, by a selected one of a plurality of passive time-delay structures, a plurality of delayed signals, wherein the plurality of delayed signals is a delayed version of a plurality of communication signals;
    generating, by an antenna array, a beamforming pattern corresponding with the selected one of the plurality of passive time-delay structures; and
    selectively connecting, by a switch, the plurality of communication signals through the selected one of the plurality of passive time-delay structures to the antenna array.

13. The method of claim 12, wherein at least one of the plurality of passive time-delay structures comprises a Rotman lens that receives the plurality of communication signals and generates the plurality of delayed signals.

14. The method of claim 13, wherein each of the Rotman lenses includes a dielectric constant that influences delays of communication signals propagating through the Rotman lens.

15. The method of claim 14, further comprising adaptively adjusting the dielectric of at least one Roman lens to change the delays of the communication signals propagating through the Rotman lens.

16. The method of claim 14, further comprising varying a value of the dielectric of at least one Rotman lens across Rotman lens.

17. The method of claim 13, wherein each Rotman lens includes lumped capacitances distributed across the Rotman lens, and further comprising adjusting the antenna pattern formed by the antenna array by adjusting values of the lumped capacitances.

18. The method of claim 12, wherein at least one of the plurality of passive time-delay structures is connected to a one of a plurality of arrays of antennas to form a beam having a different polarization than a beam formed by a different one of the plurality of passive time-delay structures.

19. The method of claim 12, further comprising selecting which of the plurality of passive time-delay structures that the plurality of communication signals are connected to based at least in part on feedback from one or more receivers.

20. A method, comprising:
generating, by an antenna array, a beamforming pattern corresponding with a selected one of a plurality of passive time-delay structures;
receiving, by the antenna array, a plurality of received signals through the beamforming pattern;
connecting the plurality of received signals through at least one of the plurality of passive time-delay structures, wherein each of the passive time-delay structures is preconfigured to receive the plurality of received signals and generate a plurality of delayed received signals, and wherein each of a plurality of delayed received signals is a delayed version of the received signals; and
processing the plurality of delayed received signals corresponding with the selected one of the plurality of passive time-delay structures.

* * * * *